United States Patent [19]

Fürer et al.

[11] 4,059,074

[45] Nov. 22, 1977

[54] DEVICE AND PROCESS FOR THE CONTROL OF EAR TICKS

[75] Inventors: Richard Fürer, Basel; Paul Halter, Bottmingen; Klaus Wettstein, Runenberg, all of Switzerland

[73] Assignee: Ciba-Geigy Corporation, Ardsley, N.Y.

[21] Appl. No.: 695,690

[22] Filed: June 14, 1976

[51] Int. Cl.² .............................................. A01K 13/00
[52] U.S. Cl. ................................................... 119/156
[58] Field of Search .................... 119/156; 40/301, 302

[56] References Cited

U.S. PATENT DOCUMENTS

| 3,595,201 | 7/1971 | Dumas | 40/301 |
|---|---|---|---|
| 3,942,480 | 3/1976 | Hair et al. | 119/156 |
| 3,949,708 | 4/1976 | Meeks | 119/156 |

Primary Examiner—Hugh R. Chamblee
Attorney, Agent, or Firm—Harry Falber

[57] ABSTRACT

A device and a process for the control of ticks in the ears of productive and domestic animals, e.g. for the control of *Rhipicephalus appendiculatus* and *Rhipicephalus evertsi* in the ears of cattle and horses, which device comprises an active-substance carrier and a holding arrangement for the active-substance carrier.

6 Claims, 7 Drawing Figures

DEVICE AND PROCESS FOR THE CONTROL OF EAR TICKS

The present invention relates to a device and a process for the control of ticks in the ears of productive and domestic animals, e.g. for the control of *Rhipicephalus appendiculatus* and *Rhipicephalus evertsi* in the ears of cattle and horses.

The species of ticks common, in particular, in Southern- Central- and East-African countries have a preference for settling in the ears of productive and domestic animals and can completely destroy the external ears of the infested animals. The dreaded theileriasis (East Coast fever, Corridor disease) is moreover transmitted by ear ticks. A high mortality rate must be reckoned with where no control of the carrier exists. The ear ticks thus cause great damage, and measures to control them are an absolute necessity.

The hitherto applied methods for the control of *Rhipicephalus appendiculatus* necessitate carrying out treatments every 3–5 days during the moist and warm season with a suitable acaricide. For the remaining species of ticks, treatments at intervals of 1–3 weeks would suffice. *Rhipicephalus appendiculatus* has consequently to be controlled by additional treatments, a procedure which is very costly and time-consuming.

It has already been suggested in the U.S. Pat. No. 3,756,200 that ear ticks in the case of cattle be controlled by a method comprising fixing to the external ear of the animal, by means of two screws, a capsule made of porous material which extends into the external auditory canal, and inserting into this capsule a strip of thermoplastic material, e.g. polyvinyl chloride, into which the active substance, e.g. 2,2-dichlorovinyl-dimethyl phosphate, is incorporated. This device is difficult to fix to the ears of the animals and is furthermore a source of irritation to the animals. They therefore attempt to rid themselves of this device.

Accordingly to the present invention, there is now suggested a device, easily attachable to the external ear of productive and domestic animals (e.g. cattle and horses), for the control of ear ticks, which device comprises a readily replaceable active-substance carrier and a holding arrangement for the active-substance carrier. The device of the invention for the control of ear ticks is characterised in that the holding arrangement consists of a pin, e.g. made from thermoplastic material, which has at one end a point provided with a barb and at the other end an extension; and in that the active-substance carrier is in the form of a disk made from sintered thermoplastic plastics material, in the surface of which there is provided an opening for location of the pin of the holding arrangement, which opening is connected with the rim of the disk by a slot, by means of which the pin of the holding arrangement can be inserted into the opening of the active-substance carrier.

The shape of the active-substance carrier can be round, oval or polygonal. Suitable as sintered thermoplastic material are, in particular, filter plates made from sintered polyethylene. The thickness of the disk is 2–5 mm and its diameter is 40–70 mm. The slot, by means of which the opening in the surface of the active-substance carrier is connected with the rim, can be arranged radially or tangentially with respect to the opening; furthermore, the slot can run straight or can be curved.

The active-substance carrier of the invention is brought into the ready-for-use condition by application of a solution of the active substance, which is absorbed by the porous material. Suitable active substances are substances which have, in addition to an adequate action against ticks, a certain volatility. A particularly suitable active substance is 2,2-dichlorovinyl-dimethyl phosphate.

Ready-made solutions containing 2,2-dicholrovinyl-dimethyl phosphate are produced by combining the active substance with an epoxide stabiliser. It is moreover advantageous to add to this mixture a resin that reduces the volatility of the active substance. Such resins which are particularly suitable are, for example, colophonium and coumarone resin. The content of active substance in the ready-for-use solution is 20 to 80 percent by weight, preferably 30 to 60 percent by weight.

The holding arrangement according to the invention consists of a pin made from thermoplastic material, which pin has at the one end a point provided with a barb, and at the other end a widened extension to prevent a loss of the holder and a sliding-off of the active-substance carrier. This widened extension can be in the shape of one or more transverse strips or rods, and where more than one are used they are arranged crosswise or radially.

In a particularly advantageous manner, however, it is also possible to use as the holding arrangement for the active-substance carrier of the invention the known identification tags that are to be fixed to the ear of the animal. An identification tag of this kind consists essentially likewise of a pin of thermoplastic material having at one end a point provided with a barb and at the other end a transverse strip, with the actual identification tag being fixed at the end of the transverse strip.

The device of the invention for the control of ear ticks is secured in a simple manner to the ears of the animals to be protected by pushing, with the aid of a hollow awl, the point provided with a barb through the external ear. The active-substance carrier of the invention is then attached to the holding arrangement by sliding the pin of the holding arrangement, along the slot of the active-substance carrier, into the opening in the active-substance carrier, an operation which can be easily and rapidly performed by virtue of the flexibility, and hence the widening of the slot, of the active-substance carrier.

The device of the invention for control of ear ticks is further illustrated by the attached drawings.

The slot 3, 3a, 3b is preferably somewhat narrower than the pin 4 (pin secured from falling out). The active-substance carrier is fitted by opening it out and hence widening the slot. The inlet end of the slot can if required be provided with bevelled edges 2a, which facilitate the mounting of the active-substance carrier.

Figure 1:
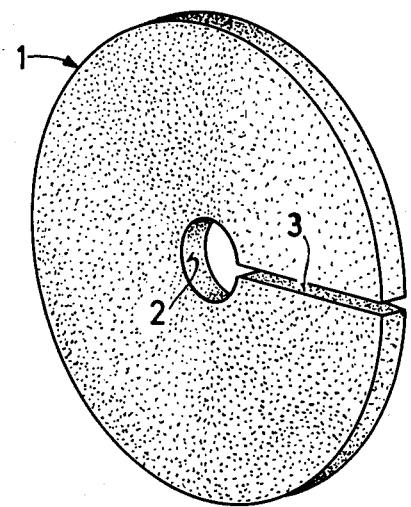
FIG. 1 shows an example of an embodiment of the active-substance carrier of the invention as a round disk 1 with a circular opening at the centre connected by a straight radial slot 3 with the rim or edge of the disk.
Figure 2:
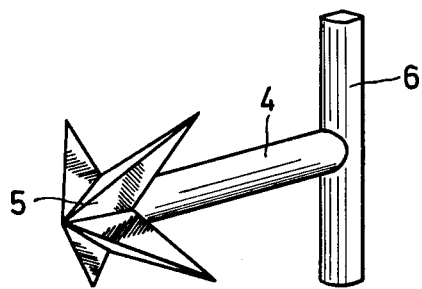
Figure 3:
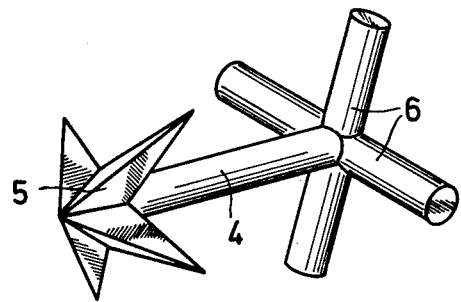
Figure 1A:
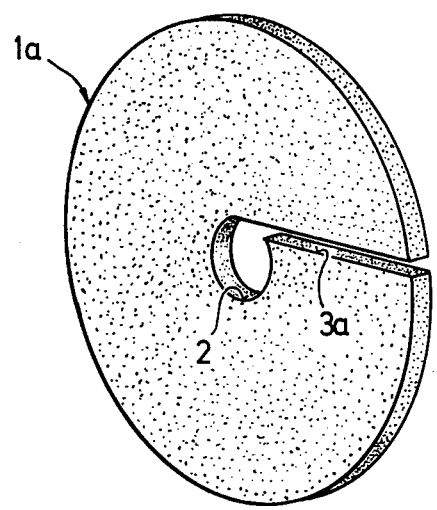
FIG. 1a shows an embodiment of the active-substance carrier in which the slot 3a is a tangential to the opening 2.
Figure 1B:
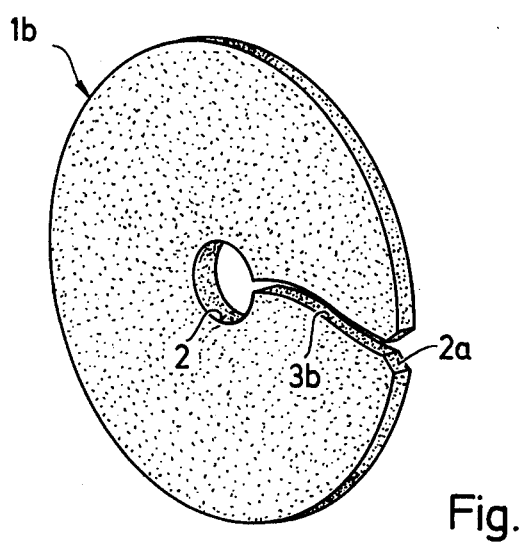
FIG. 1b shows an embodiment of the active-substance carrier in which the slot 3b is curved.

FIGS. 2 and 3 show embodiments of the holding arrangement of the invention for the active-substance carrier, which comprise at the one end of a pin 4 the point 5 provided with a barb and at the other end an extension 6 in the form of one or two transverse strips or rods.

Figure 4:
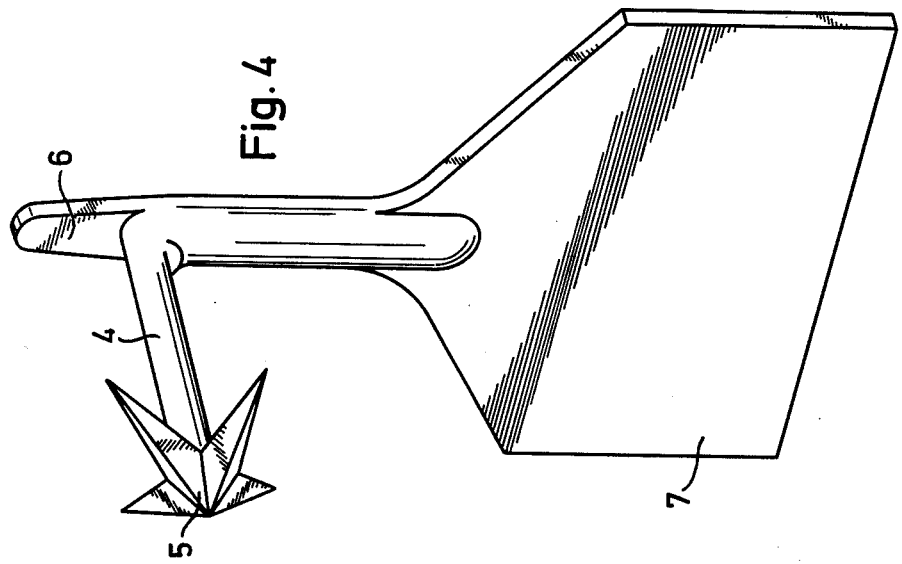

FIG. 4 shows an embodiment of the holding arrangement of the invention for the active substance carrier which is designed to have one transverse strip as the extension 6, with, however, an identification tag 7 being attached to one end of this transverse strip. This design corresponds to the known identification tags that have been in use for some time. Since these identification tags are in any case attached to the ears of the animals, the active-substance carrier of the invention can be combined with particular advantage with such identification tags.

Figure 5:
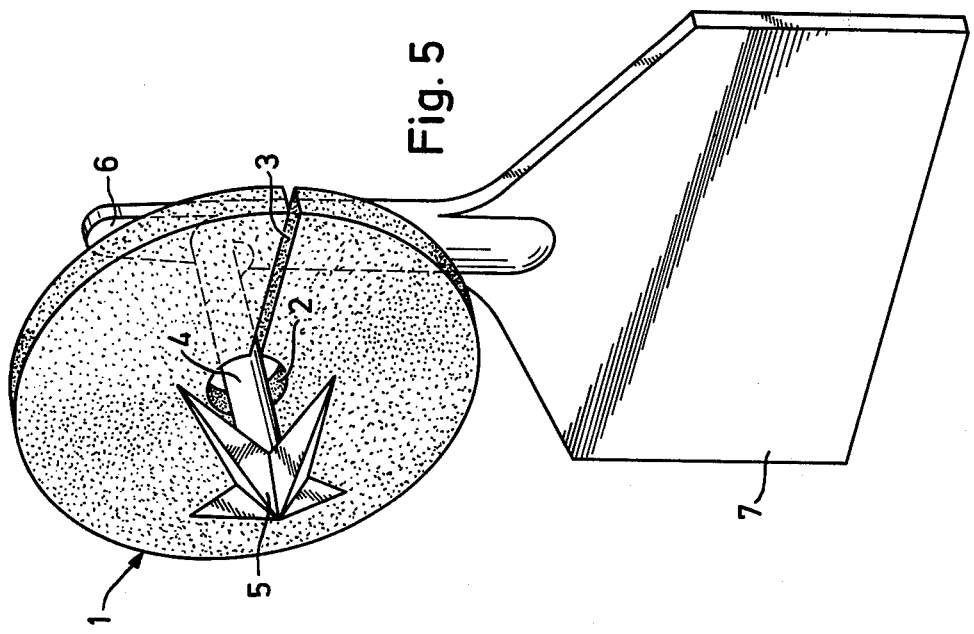

FIG. 5 shows finally an identification tag according to FIG. 4, the pin 4 of which has been inserted into the opening 2 of the active-substance carrier of the invention.

The device according to the invention for the control of ear ticks can be secured rapidly and in a simple manner to the ears of the animals. A further advantage is that the active-substance carrier can be quickly and easily replaced when the active substance thereon has been consumed.

The production of an active-substance solution suitable for the device of the invention for the control of ear ticks and its application to the active-substance carrier of the invention are described in the following Example.

EXAMPLE

A polyethylene filter plate having a thickness of 3 mm is used as the carrier. The pore size is approx. 65 $\mu$ and the pore volume is approx. 36%. From this material there are used round disks of 5 cm diameter having an 8 mm hole at the centre. The active substance is applied as a solution consisting of 40 w/w % of DDVP, 40 w/w % of liquid epoxide stabiliser and 20 w/w % of colophonium.

2 g of the active-substance solution is distributed on a disk in such a manner that the whole carrier is uniformly wetted.

We claim:

1. Device for the control of ear ticks on productive and domestic animals, which device comprises an active-substance carrier and a holding arrangement therefor said holding arrangement comprising a pin made from thermoplastic material, which has at one end a point provided with a barb and at the other end an extension; whereby said active-substance carrier is in the form of a disk made from sintered thermoplastic material, in the surface of which is an opening for the location of said pin, which opening is connected with the rim of the disk by a slot, by means of which said pin can be inserted into said opening.

2. Device according to claim 1, in which the active-substance carrier is a filter plate made from polyethylene, the thickness and diameter of which are 2 - 5 mm and 40 - 70 mm, respectively.

3. Device according to claim 1, in which the slot is arranged radially or tangentially with respect to the opening.

4. Device according to claim 1, in which the slot is straight or curved.

5. Device according to claim 1, in which the extension at the end of the pin is in the form of one or more transverse strips arranged, in the case where there are several, crosswise or radially.

6. Device according to claim 1, in which the extension at the end of the pin is in the form of a transverse strip, at the one end of which is located an identification tag.

* * * * *